March 13, 1962      J. C. COPES      3,025,070
SPLIT MECHANICAL SEALS
Filed Dec. 11, 1959      3 Sheets-Sheet 1

JOHN C. COPES
INVENTOR.
BY Wm. E. Ford
ATTORNEY.

March 13, 1962

J. C. COPES 3,025,070

SPLIT MECHANICAL SEALS

Filed Dec. 11, 1959

JOHN C. COPES
INVENTOR.

BY Wm. E. Ford

ATTORNEY

March 13, 1962  J. C. COPES  3,025,070
SPLIT MECHANICAL SEALS

Filed Dec. 11, 1959 3 Sheets-Sheet 3

JOHN C. COPES
INVENTOR.

BY Wm. E. Ford

ATTORNEY.

United States Patent Office 3,025,070
Patented Mar. 13, 1962

3,025,070
SPLIT MECHANICAL SEALS
John C. Copes, New Orleans, La.
Filed Dec. 11, 1959, Ser. No. 859,000
3 Claims. (Cl. 277—39)

This invention relates to a split mechanical seal constructed to permit easy removal and replacement of the elements relatively rotatable with relation to each other, thereby effecting savings in labor and maintenance costs in cases where the unavoidable wear between such elements requires frequent replacement, this application being a continuation-in-part of co-pending Application Serial No. 706,511 filed December 31, 1957, for Split Mechanical Seal.

In machines employed in plants and in various other usages as operative equipment, and most commonly in centrifugal pumps, it is necessary to provide a seal between a rotary member, such as a shaft, and a stationary member, such as a housing, or conversely, between a rotary housing, and the like, and a stationary shaft, stud, pipe, or similar round member. Such seals, although made of wear resistant material, and often specially treated to increase resistance to abrasion, wear, or corrosion, nevertheless in service will wear away or become corroded so that it is necessary at relatively frequent intervals to replace the parts which are in surface to surface contact upon relative rotation therebetween.

Frequently, and as a general proposition, such parts of annular shape, integrally formed and not interrupted or split, will require removal of surrounding and adjacent machine parts, at a great expenditure of time and labor, and with consequent excess monetary loss, before ample access room can be had to permit replacement. For instance, in a case where a shaft may extend from a housing, the exterior bearing or journal member for such shaft or otherwise parts connected to the shaft, as a clutch, externally of the housing, will have to be removed before such wear elements can be brought into access position for removal. During this period the machine driven by the shaft is "down" or inoperative, and its production is lost during the interval of repair. Also, it takes considerable time to remove sufficient parts to obtain access space for replacement of the wear elements.

The solution to this problem has resided in providing opposed ring inserts in adjacent rotary and stationary parts of a seal assembly, so that the elements containing the inserts do not have to be split, with the resultant chance of leakage between the adjacent split segments, but rather the ring inserts are split, while being adapted to maintain firm contact between adjacent segments of the ring inserts. Considering the foregoing, the objects of this invention will be apparent, including the objects hereinbelow set forth.

It is a primary object of this invention to provide a mechanical seal of this class in which the adjacent elements of the rotary and stationary parts of the seal have split ring inserts therein to bear in face to face, sealing contact during relative rotation therebetween, thereby permitting ease of access for replacement of the inserts in case of wear therebetween.

It is another important object of this invention to provide a seal of this class in which the adjacent elements of the rotary and stationary parts of the seal have split ring inserts therein to bear in face to face, sealing contact during relative rotation therebetween while the adjacent elements containing such inserts are integrally formed, uninterrupted elements not themselves subject to wear by rotational contact therebetween, nor to the hazards of excess centrifugal force acting directly thereupon, nor to dangers from leakages between adjacent split segments as otherwise might occur were such elements themselves split.

It is also another and paramount object of this invention to provide a mechanical seal of this class in which the wear parts are easily removed and replaced within minimum time limits, thereby effecting savings in time, labor, and shut-down.

It is another and further object of this invention to provide a seal of this class adapted to be constructed to carry out the foregoing objects with a minimum cost in labor and materials, and with a minimum of working parts.

It is also another and further object of this invention to provide split mechanical seals of this class employable with structure adapted to permit the removal of the split mechanical seal inserts as for exchange, while at the same time mechanically sealing off the seal parts from pressure fluid access during such exchange.

It is still a further and other object of the invention to provide split mechanical seals of this class employable with structure adapted to permit the removal of the split mechanical seal inserts, as for exchange, while at the same time acting responsive to automatic actuation, as by the closure of an electro-magnetic circuit, to seal off the seal parts from pressure fluid access during such exchange.

Other and further objects will be apparent when the specification herein is considered in connection with the drawings in which.

Figure 1:
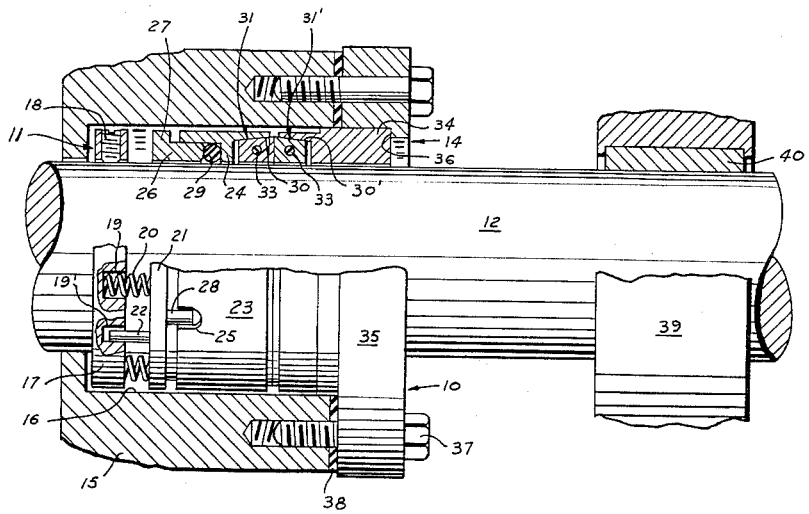
FIG. 1 is a sectional view showing an early embodiment of the invention.

Referring in detail to the drawings in which corresponding reference numerals are assigned to corresponding elements in the various views, a mechanical seal 10 is shown in FIG. 1 comprising an assembly 11 connected to a stationary part or assembly, as a housing 15, such as a pump housing. The housing 15 has a counterbore 16 therein into which the shaft connected assembly 11 and part of the stationary assembly 14 is shown extending.

The innermost element of the assembly 11 is a collar 17 which is connected to the shaft 12 by means of set-screws 18 threaded through tapped radial holes in the collar. The outer face of the collar 17 has angularly spaced apart recesses 19 therein to receive the inner ends of springs 20 therein, and such face also provides therein angularly spaced apart recesses 19'. Outwardly of the collar 17 a compression ring 21, as will be hereinbelow described, surrounds the shaft 12.

The springs 20, which bear at one end in the collar recesses 19, bear at their other ends against the inner face of the compression ring 21, and this inner face has pins 22 extending therefrom into the collar recesses 19' so that when the collar 17 rotates with the shaft 12, a driving connection is effected between the collar and the compression ring. Adjacent the compression ring 21 and surrounding the shaft 12 there is provided a seal ring 23 which has an internally extending flange 24 centrally therein, such seal ring providing recesses 25 in the inner face thereof. The compression ring 21 has a turned down or reduced diameter part 26 as the outer part thereof, leaving a larger diameter or flange portion 27 as the inner part thereof from which the pins 22, hereinabove described, extend inwardly, and from which pins 28 extend outwardly into the recesses 25 in the seal ring 23 to establish a driving connection between the compression ring 21 and the seal ring 23. The seal ring 23 receives therein the part 26 extending from the compression ring 21 to bear against a packing element as an O-ring 29 to force it as a static seal against the inner face of the internally extending flange 24, as the springs 20 urge the compression ring outwardly. In this manner a seal is effected against fluid passage between the shaft and the O-ring and between the seal ring and the O-ring.

On the opposite side of the flange 24 from the O-ring 29, the inner surface of the seal ring 23 is tapered outwardly at 30 as shown, and a split ring insert 31, comprising the half-ring parts 32, 32' and correspondingly tapered to fit within the taper 30 is insertable into the taper but short of contact with the outer face of the internally extending flange 24. Dowels 33 and corresponding recesses are provided in the respective insert ring parts or segments 32, 32' to insure aligned interfitment and identification of such segments.

Outwardly of the split ring insert 31' an insert adapter 34 surrounds the shaft 12 and has a tapered bore 30' therein to receive a correspondingly tapered split ring insert 31' extending into the bore 30' but slightly short of the base of the bore, the segments of the ring having intermating dowels and recesses, not shown, but corresponding to the dowels and recesses of the respective segments 32, 32'. The adapter 34 is press-fitted into a connection flange 35 to shoulder at 36 therein, such flange surrounding the shaft 12, and being connected to the housing 15 by means of stud bolts 37, a suitable gasket 38 being provided to effect sealing between the housing and the flange 35. The inner end of the adapter 34 is of diameter to slidably and guidably fit within the bore 16, as shown in FIG. 1.

Usually, such a seal 10 is installed adjacent to some element or mechanism which drives the shaft 12, which is driven by the shaft, or in which the shaft is journalled. As shown in FIG. 1 a journal member 39 having bushing means 40 therein through which the shaft 12 extends, is positioned to support the shaft 12 in such proximity thereto that the journal 39 will have to be moved outwardly along the shaft 12, or altogether removed, to provide room to remove the wear elements between the rotary assembly 11 and stationary assembly 14, in cases where such elements are not split for easy removal.

However, with the instant structure, it will not be necessary to remove the journal 39, as it is only necessary to disconnect the connection assembly 14, comprising the flange 35 and its insert adapter 34, in order to remove the split ring insert 31' and gain access to remove the split ring insert 31 in the seal ring 23. Thereafter, there can still be room enough gained after the assembly 14 is slid outwardly toward the journal member 39, to draw the seal ring 23 outwardly to gain access to the compression ring 21 and the collar 17 inwardly thereof.

Figure 2:
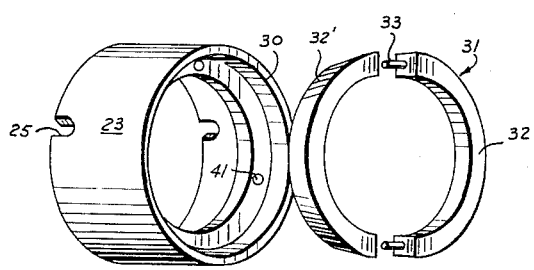
FIG. 2 is a perspective view of the seal ring and the split ring insert therefor, as shown in section in FIG. 1.

After access has been gained to the split ring inserts 31 and 31' it may nevertheless be difficult to remove them from the seal ring 23 and adapter insert 34, respectively. To facilitate such removal access holes for knock-out punches are provided, such holes 41 are shown in FIG. 2 in the internally extending flange 24, and corresponding holes, not shown, would extend through the adapter insert 34 to give access to punch out the split ring insert 31'.

As a matter of construction the inserts 31, 31' may be of any two suitable, wear resistant, diverse materials, for instance one may be of a high grade carbon while the other may be of stellite. As another example, one may be of cast iron and the other of ceramic.

The invention is not limited to the specific arrangement shown, for instance the housing 15 and the assembly 14 carried thereby may be the rotary part, and what is shown as the shaft 12 and the assembly 11 mounted thereon may be the stationary part. Also the housing 15 could extend to the right of the flange 35, rather than to the left thereof, as shown in FIG. 1. And other arrangements are possible in which the basic principles of the split ring inserts may be employed.

Figure 3:
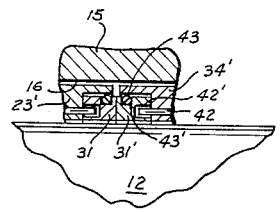
FIG. 3 is a sectional fragmentary view showing another form of split ring insert, seal ring, and insert adapter, differing in degree from the construction of these elements shown in FIG. 1.

As shown in FIG. 3, variations in the split ring inserts themselves may fall within the scope of the invention. In this modification the seal ring 23' and the insert adapter 34' are not tapered, while the respective split ring inserts 31 and 31' are not spaced from the internally extending flange 24 and from the inner face of the insert adapter 34, but rather driving connection is effected between these elements, as by drive pins 42 extending from the flange 24 and from the adapter insert 34, into, but not to the ends of holes 42' in the split ring inserts.

The inserts 31 and 31' have peripheral grooves 43' therein to receive O-rings 43 to effectively seal against fluid passage between these inserts and the seal ring 23' and adapter insert 34' respectively. Then, since the springs 20 are of strength to effectively urge the insert 31, as it rotates, to maintain effective face to face sealing with the stationary insert 31', no leakage can occur along these sealing surfaces.

Figures 4, 5:
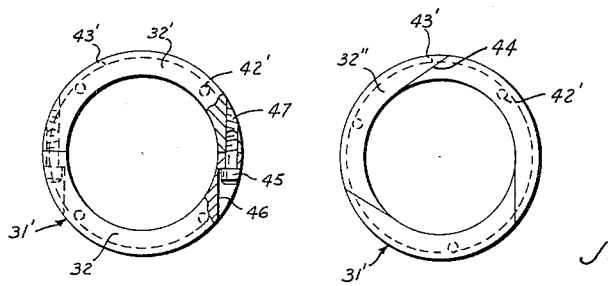
FIG. 4 is a transverse view of one modification of split insert ring construction corresponding with the sectional fragmentary view shown in FIG. 3.
FIG. 5 is a transverse view of another modification of split insert ring construction, such view also corresponding with the sectional fragmentary view shown in FIG. 3.

FIGS. 4 and 5 may be considered views looking at the face of the right hand split ring insert 31' shown in FIG. 3, each view showing a variation of construction to insure that the adjacent ring segments are held together and maintain sealing contact therebetween in service. As shown in FIG. 4, the ring segment 32 is bored and counterbored on opposite sides thereof to receive cap-screws 45 with heads to shoulder at the bases of the counterbores 46, while the ring segment 32' has tapped holes 47 on opposite sides thereof to receive the threaded shanks of the cap-screws 45. As shown in FIG. 5, the ring segments 32" are divided from each other by tangentially extending splits 44, so that in case the segments tend to slide one upon the other responsive to centrifugal force, sealing effect is still maintained between the adjacent segment surfaces.

Figure 6:
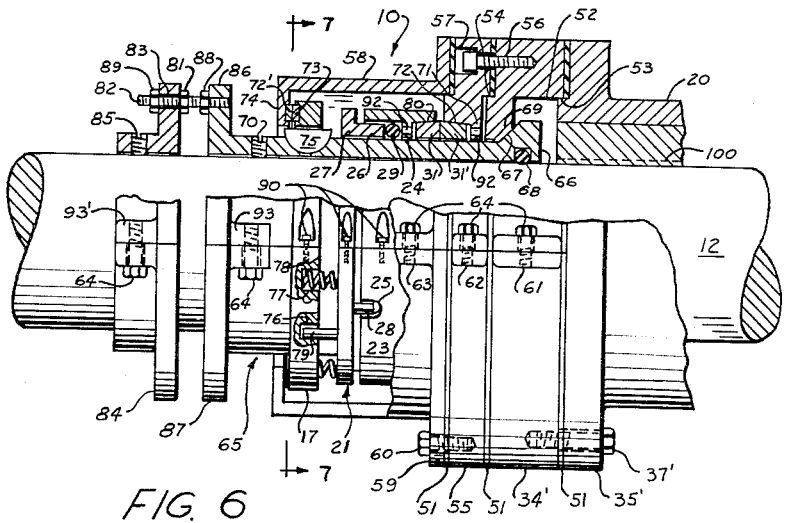
FIG. 6 is a sectional view of a later embodiment of the invention, including the means enabling the structures of the seal to mechanically seal off the seal parts from pressure fluid access during a period when the split mechanical seal inserts are to be accessible, as for removal and exchange.
Figure 7:
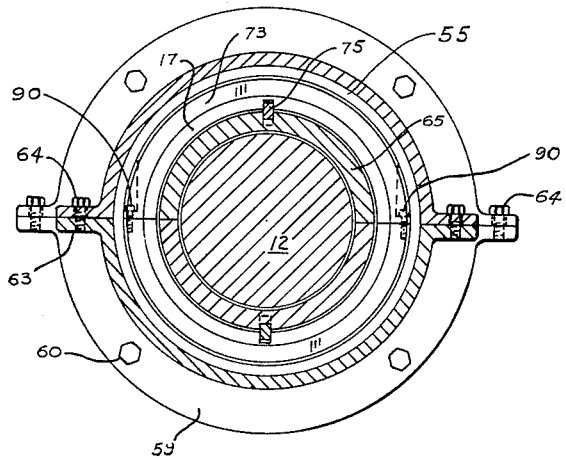
FIG. 7 is a transverse sectional view taken along line 7—7 of FIG. 6.

As shown in FIGS. 6 and 7, a modification of the invention is disclosed in which the seal parts may be protected from pressure fluid when it may be desired to remove and exchange tapered split ring inserts 31, 31'. In such modification a shaft 12 is shown extending with clearance through a stationary assembly structure including a housing 20 and a split inner adapter 34', which comprises the inner element of a split mechanical seal 10. Such split inner adapter 34 comprises the means which is connected to the structure or housing by means of cap-screws or stud bolts 37' passing through holes in a flange 35' provided by the housing or structure 20. The shaft 12 extends through the housing 20, including the flange 35' and through the various parts of the seal 10 as will be hereinbelow described.

The adapter 34' has a reduced diameter inner bore 52 to fit on a receiving boss 53 provided on the outer face of the outer flange 35' of the housing 20. On the opposite side of the adapter 34' its outer face provides in twin a boss 54 to receive thereover the inner bore of a split outer adapter 55 which is connected to the inner adapter 34' by means of socket head cap screws 56 provided with heads to seat in suitable recesses 57 provided therefor in the outer face of the outer adapter 55. Outwardly of the outer adapter 55 a split seal housing 58 is provided with a base flange 59 on the inner end thereof which is connected by suitable cap-screws 60 to the outer face of the outer adapter 55.

Suitable gaskets 51 are provided between the housing flange 35' and the inner adapter 34', between the inner adapter 34' and the outer adapter 55 and the split seal housing flange 59. Suitable lugs 61, 62 and 63 extend outwardly from the split surfaces between the segments of the inner adapter 34', outer adapter 55, and seal housing 58, respectively, and these elements are tied together on opposed sides of the shaft 12 by suitable cap-screws 64.

A sleeve 65 is provided and slid upon the shaft 12 prior to the assembly therearound of the split parts of the split seal 10. Such sleeve 65 has as its inner element a flange 66 tapered upwardly and radially inwardly from its upper outer corner to provide a tapered, outwardly facing, annular seating surface 67. A conventional annular groove is provided within the sleeve flange 66 to receive an O-ring 68 therein to seal between the shaft 12 and the sleeve 65. A tapered, inwardly facing, annular surface 69 is provided within the inner adapter 34' to extend parallel to the seating surface 67, such surfaces being normally spaced apart as shown in FIG. 6 by means of a set-screw 70 provided outwardly of the split seal housing 58 to connect the sleeve 65 to the shaft 12.

The outer adapter 55 has an inwardly extending web or flange 71 through which the shaft 12 extends with clearance, and on the outer side the inner surface 72 the outer adapter 55 is tapered outwardly with greatest diameter outermost. A tapered split ring insert 31' is tapered on its outer surface in accordance with the taper of the surface 72. This insert 31' receives the sleeve 65 therethrough with slight clearance and its tapered outer surface is pressed within the adapter surface 72 to effect a rigid driving connection therebetween which press fitted connection also inhibits relative rotation between the two elments. As shown in FIG. 6, when thus fitted the tapered split insert 31' extends outwardly beyond the outer adapter 55 and terminates in a radially extending surface perpendicular to the sleeve and shaft axis.

As the set screw 70 affixes the sleeve 65 in the position shown in FIG. 6, it brings into contact two radially extending wear or bearing contact rings or elements 72', 73 of dissimilar materials, one being say of bronze and the other being say of cast iron. The elements 72', 73 are carried respectively by the inner surface of the outer end 74 of the split seal housing 58 and by the outer surface of a collar 17. The collar 17 has a key slot or key slots therein to receive Woodruff keys 75 therein, such keys being fitted inwardly thereof into slots in the sleeve 65 thereby to effect a driving connection between the sleeve 65 and the collar 17. Also the sleeve 65 may be moved axially with relation to the collar 17 as a Woodruff key or keys 75 move with the sleeve 65 and through the aforesaid collar key slot or slots therefor.

The collar 17 has bores 76, 77 in the inner face thereof, such bores preferably being equally angularly and radially spaced apart with relation to the axis of the shaft, sleeve, and collar and alternately the bores 77 have the outer ends of springs 78 biased therein or receive thereinto pins 79 for a distance short of the bore bottoms. A compression ring 21, slidable upon the sleeve 65, comprises a functionally intervening means between the collar 17 and the seal ring 23, and the pins 79 extend from an outer or flange portion 27 of a compression ring 21, and the springs 78 also are inwardly biased to bear against such flange 27. The pins 79 thus connect the collar 17 and compression ring 21 to rotate together, while the springs 78 effect a yieldable driving engagement therebetween.

The inner portion 26 of the compression ring 21 is of reduced diameter to fit within the outer bore of a rigid or rigidly constructed, split seal ring 23 so that the inner end face of the compression ring portion 26 bears against an O-ring seal 29 to urge it inwardly against an inwardly extending flange 24 of the seal ring 23. The seal ring 23 in its outer face provides recesses 25 to receive therein pins 28 extending inwardly from the inner face of the compression ring flange 27 and thereby the compression ring 21 and seal ring 23 are connected to rotate together.

Inwardly of the internal flange 24 of the seal ring 23, the seal ring inner surface 80 is tapered from a smallest diameter adjacent such flange to a largest diameter at the inner end of the seal ring 23, and a split ring insert 31, similarly tapered on its outer surface, receives the sleeve 65 therethrough and is press fitted within the tapered surface 80 to effect a rigid driving connection between the split ring insert 31 and the seal ring 23. As thus press fitted, relative rotation between insert and seal ring is inhibited. When thus fitted the tapered split insert 31 extends outwardly beyond the inner end face of the seal ring and terminates in a radially extending surface perpendicular to the sleeve and shaft axis to bear in surface to surface contact with the outer face of the insert 31'.

Thus a driving connection is transmitted between the shaft 12, through the sleeve 65 keyed thereto, by way of the collar 17 so that the bearing or wear element rotates in face to face, sealing contact with the bearing or wear element which is stationarily carried by the split seal housing 58 since the seal housing 58 is fixed to the outer adapter 55, the outer adapter 55 is fixed to the inner adapter 34', and the inner adapter 34' is in turn fixed to the housing or structure 20.

In like manner, the collar 17 which rotates with the shaft 12 is connected to drive the compression ring 21 without relative rotation therebetween, and the compression ring 21 is in turn connected to drive the seal ring 23 without relative rotation therebetween. Thus since the O-ring seal 29 between seal ring 23 and compression ring 21 may be compressed to full compression before the compression ring pins 28 may bottom in the recesses 25 or the pins 79 bottom in the bores 76, the springs 78 may urge inwardly to force the compression ring 21 to force the seal ring 23 to maintain the insert 31 in rotation in face to face contact with the insert 31' which is supported by the non-rotated outer adapter 55.

Referring to FIG. 6, a seal is effected by the O-ring seal 68 against fluid escape outwardly between sleeve 65 and shaft 12. Also the face to face contact between the inserts 31, 31' prevents fluid escape outwardly at this point, while the O-ring seal 29 prevents fluid escape between sleeve 65 and seal ring 23 and between sleeve 65 and compression ring 21, also between compression ring 21 and seal ring 23. Thus effective sealing against fluid leakage from the housing 20 is provided while at the same time there is only relative rotation combined with sealing required between the split inserts 31, 31' while the wear or thrust bearings 72', 73 are the only other elements required to take relative rotation.

It is desirable, without leakage, to disassemble the split seal 10 to replace parts, such as the split ring inserts 31, 31'. This requires that the outer adapter and all parts outwardly thereof with the exception of the sleeve 65 must be removed. This can be accomplished without fluid leakage from the housing 20 by moving the sleeve 65 with relation to the inner adapter 34' and the split seal housing parts to bring the sleeve and inner adapter respective seating surfaces 67 and 69 into sealing abutment.

This can be done by first removing the set screw 70. Thereafter nuts 81 on studs 82 which extend through holes 83 in a split flange 84 affixed to the shaft 12 outwardly of the sleeve 65 by a set screw 85 passing threadedly through the hub of the flange 84. The studs 82 also extends through threaded holes 86 in the sleeve flange 87. Lock nuts 88 which are threaded on to the studs 82 to bear upon the outer face of the sleeve flange 87 connect the sleeve 65 and the studs 82 in manner to avoid against relative rotation therebetween. Then nuts 89 on the studs 82, with inner surfaces thereof bearing against the outer surface of the flange 84, are turned evenly to draw the sleeve 65 evenly outwardly as the Woodruff keys 75 slide outwardly in the slots in the collar 17 into which such keys have been fitted. Thus the surfaces 67, 69 will be brought into sealing contact to cooperate with the O-ring seal 68 between sleeve and shaft to positively seal the interior of the housing 20 against fluid leaking outwardly therefrom while the split seal is disassembled.

Disassembly may now be accomplished by removing the cap screws 60 to disconnect the split seal housing flange 59 from the outer adapter 55. Then remove cap screws 64 from the lugs 63 connecting the split seal housing segments. Then the collar 17 is slid outwardly over the Woodruff keys 75 to relieve the pressure of the springs 78. Then the compression ring 21 may be slid outwardly until the pins 28 may clear the slots 25. Then the split seal ring 23 having the split ring inserts 31 press fitted therein, may be disassembled and removed by turning the socket head cap screws 90 in their counterbores to unthread them from the threaded bores into which they extend to join the two segments of the seal ring 23. Then the two seal ring segments can be removed and the split ring insert segments removed therefrom. Thereafter the capscrews 56 may be removed to free the outer adapter 55 from the inner adapter 34'. Thereafter the capscrews 64 may be removed from the lug 62 to permit the two outer adapter segments to be separated and the split ring inserts 31' removed therefrom.

The seal ring 23 is shown split in FIGS. 6 and 7 and in like manner the outer adapter is shown split. In case these elements were not split nevertheless the split ring inserts 31, 31' could be removed by sliding the seal ring 23 and outer adapter 55 to a position on the shaft 12 where access could be had to insert a punch through access holes 92 provided in the respective internal flanges 24 and 71.

The compression ring 21 and collar 17 are shown split with segments assembled by socket head capscrews 90 as hereinabove described for the assembly of the seal ring 23. The sleeve 65 is also shown split and the segments thereof assembled by capscrews 64 passing through abutting segment lugs 93. The flange 84 is also shown split and the segments thereof assembled by capscrews 64 passing through abutting segment lugs 93'.

A construction, as shown, with all elements exterior of the housing being of split construction, permits the widest flexibility of assembly within the most limited space limitations as involves sliding elements on the shaft 12 when a most limited length of shaft may be free for this purpose.

Figure 8:
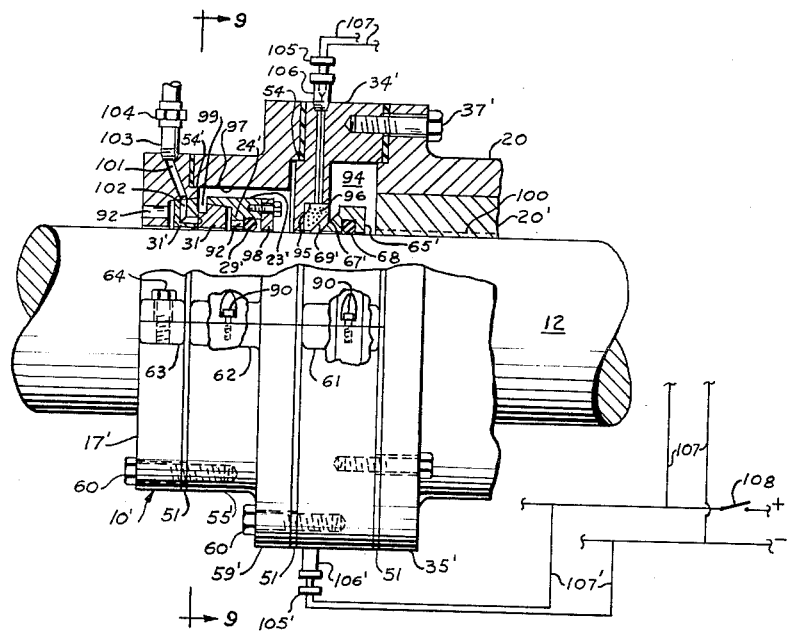
FIG. 8 is a sectional view of another later embodiment of the invention including the electro-magnetic actuated means enabling the structures of the seal to seal off the seal parts from pressure fluid access during a period when the split mechanical seal inserts are to be accessible, as for removal and exchange.
Figure 9:
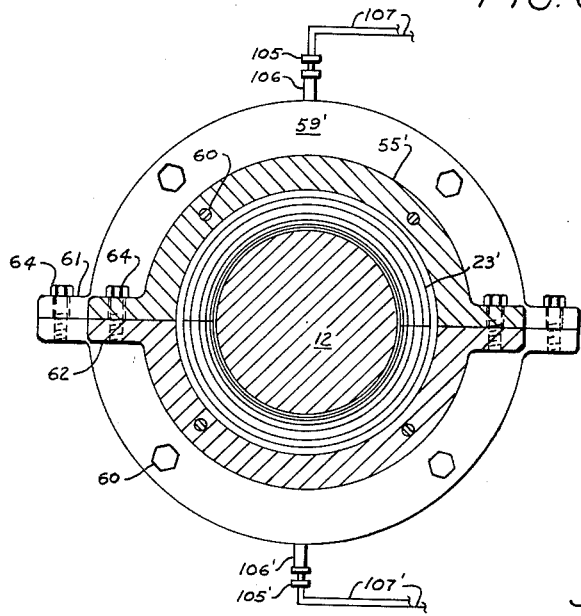
FIG. 9 is a transverse sectional view taken along line 9—9 of FIG. 8.

Another modification of the invention is shown in FIGS. 8 and 9 requiring a reduced number of parts from the number of parts required in the modification of FIGS. 6 and 7, electrical energy taking the place of the operation of mechanical parts in order to seal off the interior of the housing while the seal parts may be changed.

In this form of the invention a shaft 12 extends outwardly from a stationary assembly structure including a housing 20 through a suitable bushing or bearing 20' in the housing wall. An inner split adapter 34' is connected by suitable capscrews 37' to a housing flange 35' comprising a part of the stationary assembly structure. The inner adapter 34' has its inner face recessed and a split seal ring 65' of a material such as a magnetic steel receives the shaft 12 therethrough and floats thereon within the recess 94. Such magnetic split seal ring 65' has an internal groove therein to receive an O-ring 68 to seal against the shaft 12.

The outer surface 67' of the magnetic seal ring 65' provides a tapered, outwardly facing, annular seating surface.

A bore in the outer face of the split inner adapter 34' receives the shaft 12 with clearance therethrough and radially outwardly thereof a counterbore 95 is provided in the inner face of the inner adapter 34' to provide a recess to receive therein two complemental segments 96. Each segment comprises a conventional electromagnet energizable upon the application of electrical energy thereto to draw the outwardly facing tapered surfaces of the floating seal ring 65' into mating contact with the correspondingly tapered inwardly facing surfaces 69' of the electromagnetic segments 96.

A boss 54 is provided on the outer face of the inner adapter 34' and a receiving recess is provided in the inner face of a split outer adapter 55' having a flange 59' connected to the inner adapter by means of suitable capscrews 60. A bore 97 is provided through the outer adapter 55' and the shaft 12 passes therethrough. Outwardly of the outer adapter 55' a split closure collar 17' is provided to receive the shaft 12 therethrough and having a boss 54' on the inner face thereof to extend into the outer end of the bore 97. Such collar 17' has a tapered recess in its inner face with largest diameter innermost and a bore radially inwardly of the tapered recess to receive the shaft 12 with clearance therethrough.

Within the recess 97 a split seal ring 23' is provided to receive the shaft 12 therethrough and having a recess in the inner face thereof to receive an O-ring 29' therein, a split retainer plate 98 being installed on the inner face of the seal ring 23' to retain the O-ring 29' within the recess and to receive the shaft 12 therethrough with slight clearance. The outer face of the seal ring 23' has a tapered recess therein with largest diameter outermost, there thus being provided an internally extending flange 24' as the base of the recess with the O-ring 29' being retained by the inner face of such flange 24'.

An outwardly tapered, split ring insert 31 is provided to receive the shaft 12 with clearance therethrough and being externally tapered to be press fitted within the seal ring tapered recess to effect a rigid driving connection with the seal ring 23' and to rotate therewith without relative rotation therebetween. Such insert 31 extends outwardly of the outer end face of the seal ring 23' to provide a sealing face extending in a radial plane perpendicular to the shaft axis.

An externally tapered split ring insert 31' is provided to receive the shaft 12 with clearance therethrough and to be press fitted within the internally tapered recess of the collar 17' to effect a rigid driving connection with the seal ring insert 31' and to rotate therewith without relative rotation therebetween. The split ring insert 31' is of a magnet material such as nickel alloy steel as Alnico #5 to provide a permanent magnet while the split ring insert 31 is of a non-conductive material as a high resistance carbon, which is turned down outwardly of the outer end face of the split seal ring 23' to provide an air gap 99 between the split ring insert 31' and the outer end face of the split seal ring 23' which itself must be of a material attracted by a magnetic force, such as one of the less corrosive carbon steels or a #400 series stainless steel.

Thus under normal conditions the split seal ring 23' is attracted by the split ring insert 31' to bring the faces of the opposed faces of the inserts 31, 31' into abutment. The bearing 20', through which the shaft 12 passes, is shown as a segmented bearing, as indicated by the dotted line 100, so that pressure fluid may pass outwardly from the housing 20 to pass between the seating surfaces 67', 69' and into the bore 97 of the inner adapter 55'. Such pressure fluid acts against the inner side of the O-ring 29' to force it against the inner face of the internal flange 24' thereby to deform the O-ring 29' into sealing and interclutching contact between the shaft 12 and the split seal ring 23'. Thus there is established by the O-ring friction a driving connection whereby the shaft rotation is transmitted to the split ring 23'. Thus the abutting faces of the inserts 31, 31' are in contact to rotate relative to each other so that the insert 31 rotates in contact with the insert 31'.

In order to cool and lubricate the contacting faces of the inserts a water passageway 101 is provided through the collar 17' to communicate with an internal, peripheral groove, not shown, but in the periphery of the internal recess which receives the insert 31'. This groove in turn communicates with a passageway 102 extending from the periphery of the insert 31' inwardly and therethrough to communicate with an annular groove, also not shown, but in the outer face of the insert 31. A suitable fitting 103 connects into the passageway 101 and a union 104 connected to the fitting 103 permits cooling water communication to be established therethrough when it is desired or necessary to cool the abutting faces of the inserts 31, 31'.

When it is desired to change parts, as to remove the inserts 31, 31' of the split seal 10', it is first necessary to establish contact between the sealing surfaces 67', 69' to seal the inner adapter 34' against the outward passage of pressure fluid from the housing 20. This is accomplished by plugging in plugs 105, 105' on opposite sides of the inner adapter 34' to carry current through conduits 106, 106' to energize the electromagnetic insert segments 96. Thus the magnetic seal ring 65' will be drawn outwardly to bring its tapered seating surface 67' into contact and sealing abutment with the insert surface 69' and the protective seal is effected.

As shown in FIG. 8, the electrical energy may come from any general source when a switch 108 provided in one of the power circuit lines + or − is closed to supply necessary current through parallel connected conduits 107, 107' which lead to the plugs 105, 105' respectively, which in turn connect with the conduits 106, 106' respectively, to the opposite sides of the inner adapter 34', whereby the electromagnetic segments 96 may be energized.

As shown in FIG. 8 suitable gaskets 51 are provided between the housing flange 35' and the inner adapter 34', between the inner adapter 34' and the outer adapter 55' and the closure 17'. Also this figure shows that the split inner adapter 34' provides lugs 61 for its segment assembly, the split outer adapter 55' provides lugs 62 for its segment assembly, and the split closure 17' provides lugs 63 for its segment assembly. Capscrews 64 shown in the case of the split closure lugs 63 are also employed in the lugs 61 and 62. As for the assembly of the segments of the magnetic seal rings 65' and of the segments of the split seal ring 23', suitable socket head capscrews 90 are employed with heads in counterbores in the upper segment and threaded shanks extending through co-axially aligned threaded bores in both upper and lower segments.

Thus the inserts 31, 31' may be replaced when the electromagnets 96 are energized to draw the magnetic seal ring 65' into seated position to seal off the inner adapter 34', and the following steps may be followed. The capscrews 60 may be removed from the inner adapter 34' to disconnect the outer adapter 55' from the inner adapter 34'. Then the capscrews 60 may be removed from the outer adapter 55' to disconnect the closure 17' and the outer adapter 55', at the same time the water being cut off to the conduit 103 and the union 104 being disconnected. Then the closure 17' may be moved slightly to break the magnetic contact between the inserts 31', 31. Then the capscrews 64 may be removed to permit the split closure 17' to be separated at the lugs 63 and the socket head screws 90 removed to permit the two segments of the split seal ring 23' to be separated.

In case it may not be desired to separate the segments of the closure 17' or of the seal ring 23', suitable knockout holes 92 are shown provided for this purpose.

The features hereinabove disclosed may be used in various combinations. For instance the arrangement for employing cooling water to the interacting insert faces shown in the modification of FIGS. 8–9 may likewise be employed to cool such faces in the modifications of FIGS. 1–5 and in the modification of FIGS. 6–7. Also, the arrangements by which substantially all elements except the housing are shown split can be modified so that only the inserts or the immediate insert receiving elements are shown split.

The invention is thus not limited to the particular variations, embodiments, and modifications shown, but other arrangements are included as well as such may fall within the broad spirit of the invention and within the broad scope of interpretation claimed for and merited by the appended claims.

What is claimed is:

1. A mechanical seal adapted to seal between stationary and rotary parts wherein said parts may comprise a shaft and a stationary assembly structure providing a tapered, inwardly facing, annular seating surface, with said shaft extending through said structure and being rotatable with relation thereto, said seal including a sleeve sealably slidable upon said shaft and connectable thereto to rotate therewith and disconnectable to slide with relation thereto, said sleeve extending with inner end within said assembly structure and said sleeve providing an outwardly facing, annular seating surface tapered in correspondence with said tapered, inwardly facing annular seating surface normally spaced from said structure therewithin whereby upon outward movement of said sleeve with relation to said shaft said seating surfaces are brought into sealing engagement to seal off the interior of said stationary structure, a rigid split seal ring around said sleeve including an inwardly extending flange, a collar connectable to rotate with said sleeve and to permit relative axial movement of said sleeve with relation thereto, an intervening means upon said sleeve between said collar and said seal ring and including yieldable means on the intervening means side of said flange to seal between said seal ring and said sleeve, said intervening means including drive means to establish a driving connection between said collar and said seal ring and yieldably urging said yieldable means to urge said seal ring away from said collar, a split, rigid, structure connected means of inner diameter to receive said sleeve with clearance therethrough, a pair of rigid split ring inserts of inner diameters to receive said sleeve therethrough with clearance, said seal ring and said structure connected means being cooperatively adapted respectively with a split ring insert to receive said insert sealably therein to establish therebetween rigid driving contact and to prohibit relative rotation therebetween, the segments into which said split ring inserts are divided by being split being adapted to maintain firm contact between adjacent segments, said seal including a split seal housing connected at one end to said structure connected means and at the other end providing a bearing contact ring against which the outer face of said collar rotates, said shaft including means to move said sleeve thereon to bring said tapered, annular seating surfaces into sealing abutment and there after said split seal housing being disconnected from said structure connected means and disassembled, and then said split seal ring being disassembled, and said structure connected means disconnected from said assembly structure and disassembled, thereby permitting access for removal and exchange of said inserts.

2. A mechanical seal adapted to seal between stationary and rotary parts wherein said parts may comprise a shaft and a stationary assembly structure with said shaft extending through said structure and being rotatable with relation thereto, said seal including a split adapter extending around said shaft and connectable to said structure and including split electromagnetic insert means therewithin complementally providing a tapered, inwardly facing, annular seating surface, said split adapter including means to energize said electromagnetic insert means, a split magnetic ring within said adapter to float sealably upon said shaft and providing an outwardly facing, annular seating surface, tapered in correspondence with said tapered, inwardly facing, annular seating surface, a rigid split seal ring around said shaft outwardly of said adapter including an inwardly extending flange, a split seal housing around said seal ring and connected at one end to said adapter and having a split closure member at the other end and around said shaft, a pair of rigid split ring inserts, each divided by being split into insert segments with adjacent segments adjoined in abutment outwardly of said shaft to maintain firm contact between abutting segments, the segments comprising each split ring insert being complementally of inner diameter to receive said shaft therethrough with clearance, said seal ring and said closure being cooperatively adapted respectively with a split ring insert to receive said insert therein to establish therebetween rigid driving contact and to prohibit relative rotation therebetween, said seal ring being subject to magnetic attraction and the closure carried insert being magnetic while the seal ring carried insert is an insulator and turned down to provide an air gap whereby said closure mounted insert may attract the seal ring to bring said inserts into face to face abutment, drive means to transmit a driving connection between said shaft and said seal ring and including yieldable means on the drive means side of said internal flange to seal between said seal ring and said shaft upon said yieldable means being subject to pressure fluid as from the interior of said structure thereby to urge said yieldable means to effect said driving connection, upon energization said electromagnetic insert means being adapted to draw said magnetic ring thereto to place the tapered annular seating surfaces of said split electromagnetic insert means and of said split magnetic ring in sealing abutment to seal off said structure against fluid leakage outwardly, thereafter said split seal housing may be disconnected from said adapter, said split seal housing and closure may be disconnected, said split seal housing may be disassembled, and thereafter said split seal ring and said split closure disassembled to permit access for removal and exchange of said inserts.

3. A mechanical seal adapted to seal between stationary and rotary parts wherein said parts may comprise a shaft and a structure as a housing with said shaft and said structure being relatively rotatable, said seal including a rigid seal ring having an internally extending flange spaced between the ends thereof and a structure connected means providing a tapered, inwardly facing, annular seating surface, said seal including a rigid seal member and also including a rigid, split ring insert divided by being split into insert segments with adjacent segments adjoined in abutment outwardly of said shaft to maintain firm contact between abutting segments, both seal member and split ring insert being of inner diameter to receive said shaft with clearance therethrough, one of said seal ring and said structure connected means being of inner diametral form and said split ring insert being externally formed to be frictionally fitted into such inner diametral form in manner that rigid driving contact is transmitted to said insert and that relative rotation is prohibited between said insert and said one of said seal ring and said structure connected means, the other of said seal ring and said structure connected means being of inner diametral form and said rigid seal member being externally formed to be frictionally fitted into the inner diametral form of the other of said seal ring and said structure connected means in manner that rigid driving connection is transmitted to said rigid seal member and that relative rotation is prohibited between said rigid seal member and said other of said seal ring and said structure means, said seal ring including seal means therein on the opposed side of said flange from said split ring insert and said seal member adapted to effect a seal against fluid passage between said seal ring and said shaft, both said flange and said structure connected means being of inner diameters to receive said shaft with clearance therethrough, said seal housing having operable therein a force applying means to urge said seal member and said split ring insert in face to face, relatively, rotatable sealing contact as said shaft is rotated within said structure whereby that one of said split ring insert and said seal member which is carried in said seal ring seals against fluid passage therebetween, said split ring insert being removable for replacement by disconnecting said structure connected means from said structure and sliding said structure connected means outwardly along said shaft to provide access for such removal, said shaft including means slidable thereon and providing an outwardly facing, annular seating surface tapered in correspondence with said tapered, inwardly facing, annular seating surface, and said seal including means adapted to slide said slidable means with relation to said shaft to draw said slidable means into sealing contact with said structure connected means whereby to bring said tapered annular seating surfaces into sealing abutment to seal off said seal from contact with hydraulic fluid from within said housing before said split ring insert is to be removed or exchanged.

References Cited in the file of this patent
UNITED STATES PATENTS

| | | |
|---|---|---|
| 1,681,770 | Kautzky | Aug. 21, 1928 |
| 1,873,859 | Bailey | Aug. 23, 1932 |
| 2,921,806 | Carter | Jan. 19, 1960 |